United States Patent [19]

Brinson

[11] 4,229,048
[45] Oct. 21, 1980

[54] WIRE WHEEL COVER

[75] Inventor: Thomas F. Brinson, Lake Park, Ga.

[73] Assignee: International Telephone and Telegraph Corporation, New York, N.Y.

[21] Appl. No.: 27,666

[22] Filed: Apr. 6, 1979

[51] Int. Cl.² ............................................. B60B 7/00
[52] U.S. Cl. .............................. 301/37 SS; 301/37 R
[58] Field of Search ........... 301/37 SS, 37 R, 37 CM, 301/59, 55, 61, 73, 104; 29/159.02, 159 A, 159.03

[56] References Cited

U.S. PATENT DOCUMENTS

| 2,710,775 | 6/1955 | Buerger | 301/37 SS |
| 3,174,803 | 3/1965 | Mulhern et al. | 301/37 CM |

Primary Examiner—H. Grant Skaggs
Attorney, Agent, or Firm—James B. Raden; William J. Michals

[57] ABSTRACT

A simulated wire wheel cover comprises a retaining ring having a plurality of retention clips fastened to the outer margin thereof for bitingly engaging a vehicle wheel. A circular mounting plate is secured to the retaining ring by clinching the outer margin or peripheral portion over a radially directed flange of the retaining ring. The mounting plate includes an annular generally radially facing flange having a plurality of circumferentially spaced apertures therein and a generally axially facing central portion. A first retaining cap is mounted to the mounting plate coaxially therewith and includes an axially inwardly directed outer flange having a plurality of circumferentially spaced slots therein. A plurality of spoke members, each having a looped central portion with angularly diverging legs extending therefrom, are provided. Each spoke is received within a respective slot with the loop being positioned on the radially inward surface of the cap flange and with the legs extending through the slot, radially outwardly therefrom and into a pair of apertures on the flange of the mounting plate. A second retainer cap having a diameter substantially less than the first cap is mounted to the first cap coaxially therewith. A second plurality of spoke members are retained by the second retainer cap and similarly extend through respective pairs of apertures on the spoke retaining flange of the mounting plate.

7 Claims, 17 Drawing Figures

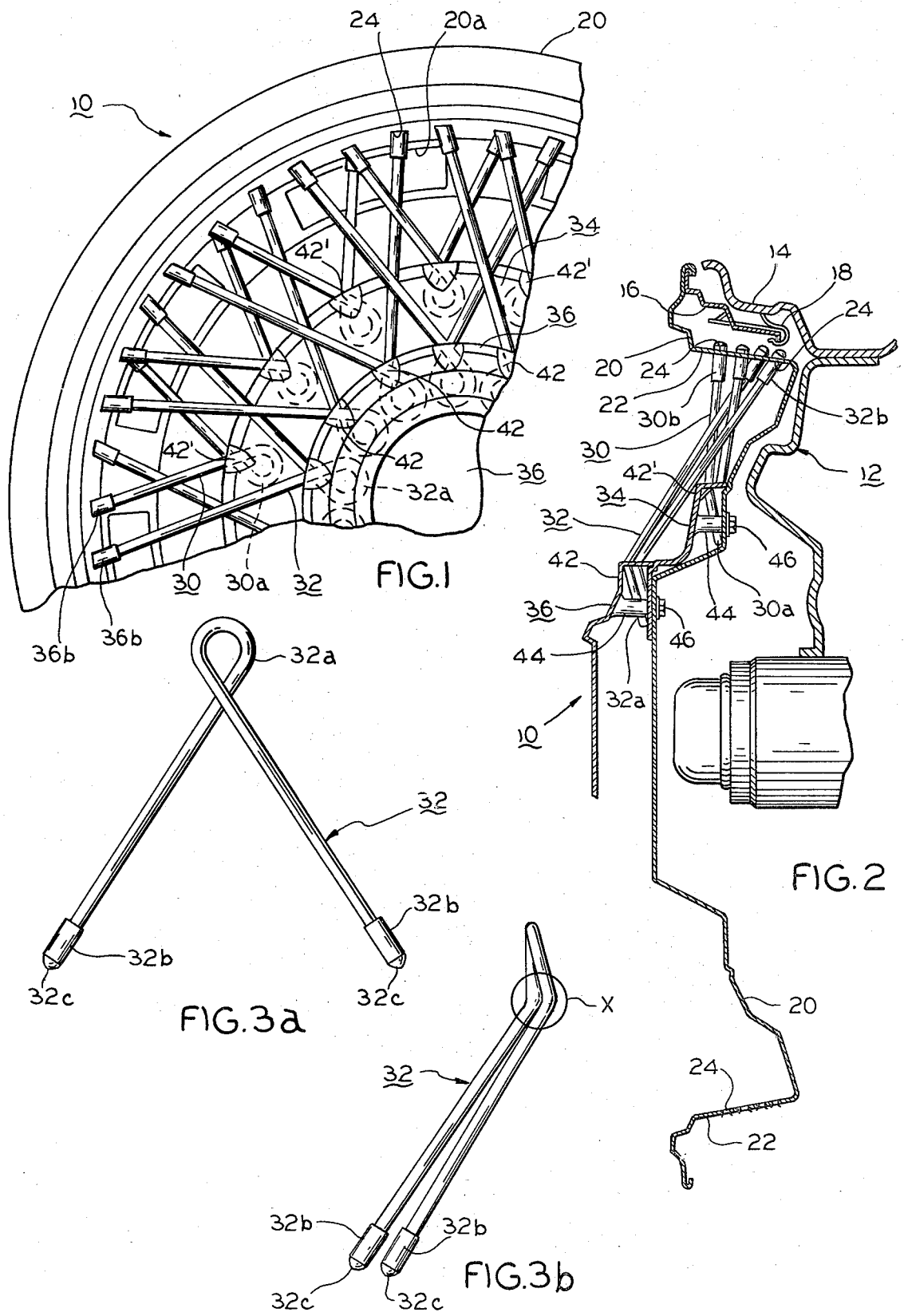

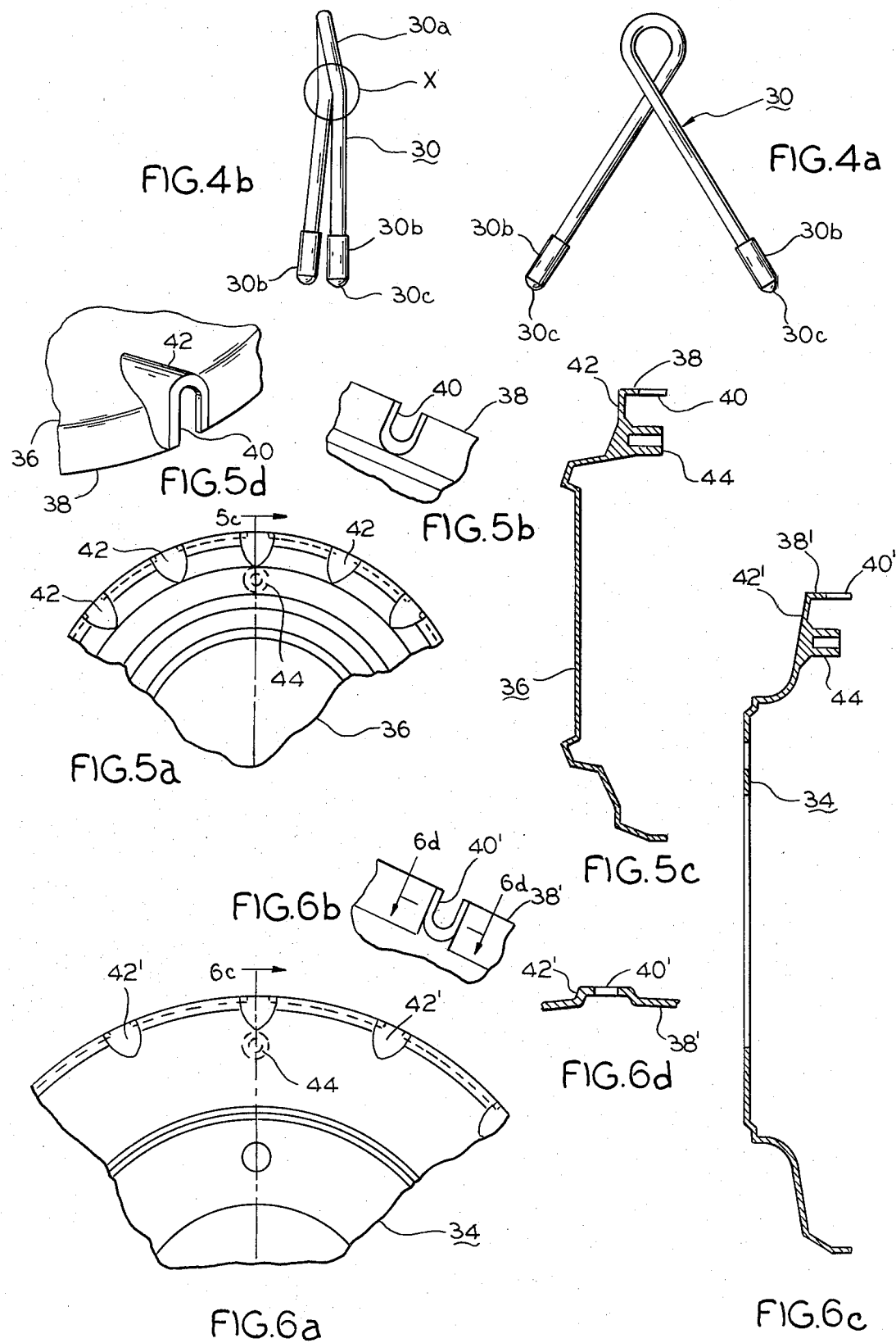

4,229,048

WIRE WHEEL COVER

BACKGROUND OF THE INVENTION

This invention relates to wire wheel covers and, more particularly, to an improved simulated spoke wheel cover.

Simulated spoke wire wheel covers are known and have been widely used in the art. These devices are exemplified in U.S. Pat. Nos. 2,710,775 and 3,174,803. The former patent discloses looped spokes which are individually fixedly fastened to a hub member and wherein successive spoke members are provided with inwardly extending threaded openings for receiving threaded fasteners which extend inwardly from an intermediate flange of the trim ring. No simulated nuts of the type which provide an authentic impression of a wire wheel are provided.

The latter patent discloses a simulated spoke wheel cover wherein hairpin or reentrantly bent spokes are secured between a radial flange portion located centrally of the wheel cover and apertures located on a radially inwardly facing flange of a generally annular inner plate. The free ends of the hairpin spokes are received within a plurality of complementary simulated nuts which are provided as separate pieces and include a truncated conical radially outward end portion which is received within the respective one of the apertures of the radially facing flange. It has been found that simulated spokes of this type are not production-tolerance tolerant. That is, should the length of the hairpin spokes vary, it has been found that the attached simulated nut may not properly seat within the aperture of the radially facing flange and undesirable visible gaps result. Such an arrangement not only leads to rattles and noise but may also render the wheel cover commercially unacceptable. Moreover, such production tolerance variations also adversely affect the seated engagement of the bend of the hairpin spokes with the centrally located radially facing flange which is intended to capture the spoke in its assembled condition.

These and other disadvantages are overcome by the present invention wherein there is provided a simulated spoke wheel cover utilizing looped spoke members which are captured at the radially inward end thereof against both radially inward and outward movement and wherein the spokes include integral means for providing simulated nuts which extend through the apertures of the radially facing outer flange in a lap-joint relationship therewith.

SUMMARY OF THE INVENTION

Briefly, a simulated wire wheel cover for attachment to the outer face of a vehicle wheel is provided. The wheel cover includes a retaining ring having a plurality of retention clips fastened to the outer margin thereof for bitingly engaging the vehicle wheel. A generally circular mounting plate is secured at its peripheral portion to the retaining ring and includes an annular generally radially facing spoke retaining flange having a plurality of apertures therein. A first generally circular retaining cap of a diameter which is substantially less than the diameter of the spoke retaining flange includes an annular generally axially inwardly directed and radially facing flange. The flange of the first cap includes a plurality of circumferentially spaced elongated slots therein which open at the axially inner edge of the cap flange. Means are provided for mounting the retaining cap to the mounting plate. A plurality of spoke members are provided each comprising an elongated member having a looped central portion the diameter of which is greater than the circumferential width of the slots and includes a pair of legs extending therefrom in a generally V-shaped configuration. Each of the spoke members is mounted in respective ones of the slots of the first cap wherein the looped portions thereof are disposed radially inwardly of the slots and wherein the free end of the legs project through the slots then generally radially outwardly from the cap flange and through a corresponding pair of the apertures of the mounting plate. A second generally circular retaining cap of a diameter which is substantially less than the diameter of the first cap is provided and includes an annular generally axially inwardly directed and radially facing flange having a plurality of circumferentially spaced elongated slots which open at the axially inner edge of the second cap flange. Means are also provided for mounting the second retaining cap to the mounting plate. A second plurality of spoke members comprising a looped central portion the diameter of which is greater than the circumferential diameter of the slots of the second cap and a pair of legs extending therefrom in a generally V-shaped configuration. Each of the spoke members is mounted in respective ones of the slots of the second cap wherein the looped portions thereof are disposed radially inwardly of the slots and wherein free ends of the legs project through the slots of the second cap then generally radially outwardly from the flange of the second cap and through a corresponding pair of the apertures of the mounting plate.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is a plan view, partially broken away, of a simulated spoke wire wheel cover in accordance with the principles of the present invention;

FIG. 2 is a cross-sectional view of the wheel cover of FIG. 1 shown in conjunction with a cross-sectional view of a vehicle wheel;

FIGS. 3a and 3b and 4a and 4b are plan and side views of looped spoke members in accordance with a feature of the present invention;

FIGS. 5a–d and 6a–d are plan partial fragmentary, cross-sectional and perspective views of the retaining caps in accordance with the present invention;

DETAILED DESCRIPTION

Figure 7:
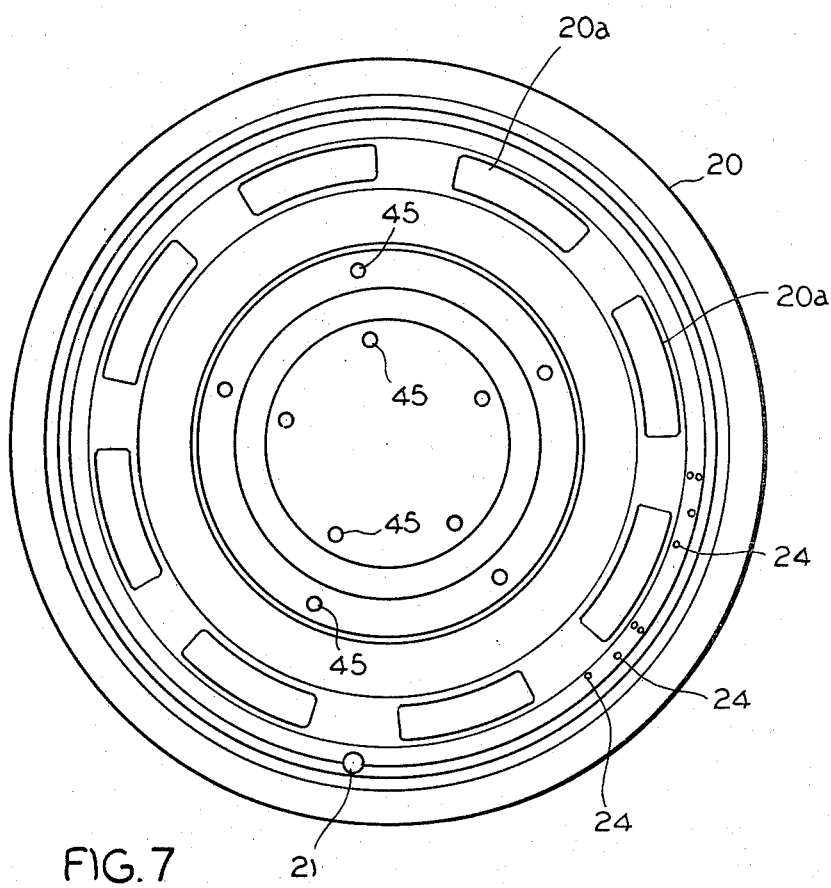
FIG. 7 is a plan view of the mounting plate for use with the wheel cover of the previous drawing figures; and, FIGS. 8 and 9 provide cross-sectional and fragmentary cross-sectional views of the mounting plate of FIG. 7 and illustrating the apertures therein.

Referring now to FIG. 1 there is shown a plan view, partially broken away, of the simulated wire wheel cover in accordance with the teachings of the present invention. The wheel cover is shown generally at 10 and as illustrated in the cross-sectional view of FIG. 2 is illustrated in conjunction with a vehicle wheel shown generally at 12. Wheel 12 includes a central circular body portion or spider with a multi-flanged drop-center rim 14 welded to its periphery. Rim 14 includes an axially directed and radially facing flange which is utilized to mount retaining ring 16 of wheel cover 10 to rim 14 as by means of fastener clips 18 which are suitably mounted to retaining ring 16 as is known in the art. However, retention clips 18 are preferably constructed as shown in the co-pending application of J. A. Bayman and R. G. Green, Ser. No. 958,982 filed Nov. 9, 1978, and assigned to the same assignee as the present invention. Wheel cover 10 includes a mounting plate 20 which is provided with a decorative finish and which is fastened to retaining ring 16 as by crimping or clinching the peripheral portion thereof about a generally radially outwardly directed flange portion of retaining ring 16, as is well known in the art. Mounting plate 20 includes eight equally spaced slots 20a, a stepped central portion, and an annular radially inwardly facing flange 22 having a plurality of apertures 24 provided therein.

Wheel cover 10 further includes a plurality of axially inner looped spokes 30 and a plurality of axially outer looped spokes 32. Outer spokes 30 are disposed between a first retaining cap 34 and radially facing flange 22 of plate 20. Outer looped spokes 32 are disposed between a second retaining cap 36 and radially facing flange 22 of mounting plate 20. It can be seen by reference to FIGS. 3a and 3b and FIGS. 4a and 4b that the looped spoke members are provided as elongated tubular rods which are looped at the intermediate portions thereof as at 32a in FIGS. 3a and 3b and 30a in FIGS. 4a and 4b. The legs of the looped spoke members diverge angularly away from the crossover at the looped sections and in a generally V-shaped configuration. The plane of the looped section is angularly related to the plane defined by the diverging legs so as to conform the assembled spoke member to the contour of the wheel cover. The free ends of the looped spokes are provided with enlarged end portions 32b and 30b as by driving a punch into the open end of the tubular configuration. Thereafter, in currently preferred practice, a female tool is driven against the enlarged open end portion to close the ends of the looped spoke into a generally semi-hemispheric configuration as at 32c in FIGS. 3a and 3b and 30c in FIGS. 4a and 4b. It will be appreciated by those skilled in the art that looped spoke members 30 and 32 can also be provided as solid rod members having an essentially identical external or visible configuration as the tubular rod members.

The looped spoke members 32 and 30 as illustrated in FIGS. 3b and 4b are shown in their assembled position with respect to the wire wheel cover 10. That is, the unassembled spokes have a gap in the encircled area X which is closed into the position indicated in FIGS. 3a and 3b when the respective retaining caps are assembled with the spokes to wire wheel cover 10. As discussed more fully hereinafter, this closing results from the predetermined structural dimensions of, and relationship of the spokes with, the elongated slots of the retaining caps.

Referring now to FIGS. 5a–d and 6a–d there are shown various views of the retention caps 34 and 36 in accordance with the principles of the present invention. As illustrated in FIG. 5a the outer margin or peripheral portion of retaining cap 36 includes an axially inwardly directed flange 38 having a plurality of circumferentially spaced elongated slots 40 provided therein. Slots 40 are formed within a projection or raised arch-like member 42 as best illustrated in FIGS. 5b and the perspective view of FIG. 5d. The circumferential width of slot 40 is preferably on the order of the outside diameter of the tubular material which comprises spoke members 30 and 32, and, more particularly, the width of the crossover portion of the spoke members. The height of slot 40 in the axial direction is on the order of twice the diameter of the tubular rod forming spoke members 30 and 32. Retaining cap 34 is similarly provided with an axially inwardly directed marginal flange 38' and circumferentially spaced elongated slots 40' formed within a raised arch-like housing portions 42'. Each of retaining caps 34 and 36 are provided with five angularly equally spaced bosses 44 which are utilized to mount retaining caps 34 and 36 to mounting plate 20 as by way of sheet metal screws or threaded fasteners 46.

Figure 8:
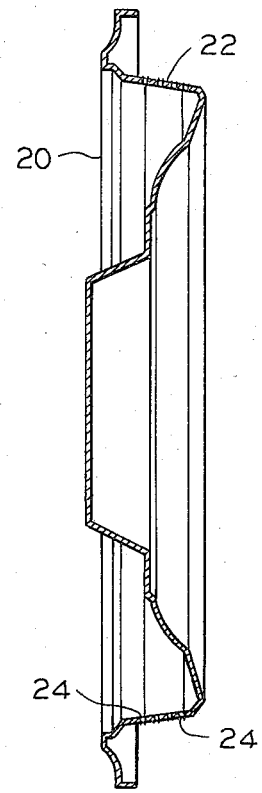
Figure 9:
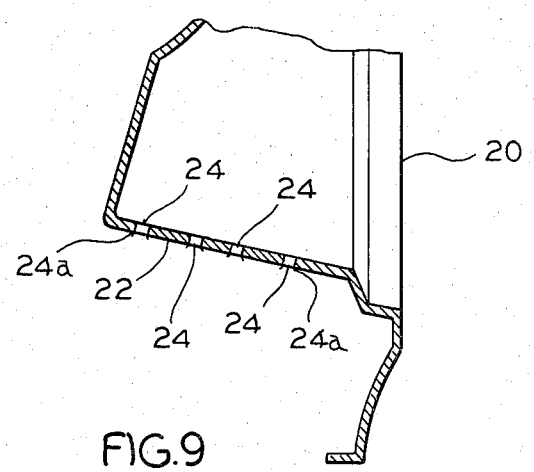

Referring now to FIGS. 7-9 there are shown plan and cross-sectional views of mounting plate 20 and illustrating the apertures 24 provided in radially facing flange 22. In currently preferred practice fifteen circumferentially equally spaced groups of four apertures are provided about the circumference of radially facing flange 22. Each of apertures 24 are preferably circumscribed with a radially outwardly extending flange 24a. The aperture flanges may also take the form of split tabs such as that which would result from a punching or other metal working operation. The diameter of the apertures and the aperture flanges is preferably approximately equal to the outside diameter of the enlarged end portions of spoke members 30 and 32, thereby to provide an essentially zero clearance interference fit. The central portions of mounting plate 20 is provided with a plurality of mounting holes 45 corresponding to the angular spacings of mounting bosses 44 of retaining caps 34 and 36. Mounting plate 20 is further provided with a valve stem hole 21 as is conventional in the art.

Referring again to FIG. 2 it can be seen that spoke members 30 and 32 are assembled to mounting plate 20 in such a manner that the end portions 30b and 32b extend through radially facing flange 22 thence radially outwardly a given distance from the radially outer surface of radially facing flange 22. In this manner, any production tolerance variations, with respect to the overall length of the legs of spoke members 30 and 32, is readily taken up by the lap-joint relationship between apertures 24 of radially facing flange 22 and the enlarged end portions 32b and 30b of spoke members 32 and 30. Moreover, the spoke members are secured at the radially inward looped ends thereof by means of the X-like crossover points provided by the configuration of the spoke members 30 and 32. That is, spoke members 30 and 32 are trapped against radially inward and radially outward movement by virtue of the circumferential width of slots 40 and 40' and the minimum dimension or hourglass shape of the spoke members at the crossover point which precludes movement radially inwardly and outwardly once the respective ones of retaining caps 34 and 36 are placed over the spoke members. Further, as previously alluded to, the axial dimensions of slots 40 and 40' are provided such that the spoke members are somewhat compressed into their assembled positions as illustrated in FIGS. 3b and 4b and are thereby pretensioned and further constrained against rattling as well as relative movement.

In currently preferred practice fifteen inner and fifteen outer looped spoke members are provided which, in turn, provides a total of sixty individual spoke-like leg members each having an integral enlarged end portion thereof which provides an integral simulated nut and which is insensitive to production tolerance variations.

It can also be seen by reference to FIGS. 1 and 2 that the open central area of the looped portions 32a and 30a of the spoke members advantageously can be utilized as a clearance hole for bosses 44. In this regard, while reliance is not placed upon boss member 44 or the fasteners associated therewith to retain the spoke members against radially inward and outward movement, the central openings can be utilized as through bores for the bosses 44 which are utilized to mount the respective retaining caps to mounting plate 20. This feature is particularly utilized with respect to the longer axially outer spokes 32 as the presently preferred complement and the relative size of the outer spokes does not provide sufficient spacing between adjacent looped portions to accommodate such boss members. Finally, it will be appreciated by those skilled in the art that the means for mounting the retaining caps to the mounting plate may take any of a number of structural configurations. For example, the first retaining cap 34 can be retained and fixedly mounted to the mounting plate by virtue of the second retaining cap 36 and wherein fasteners 46 are only utilized with the second retaining cap 36.

What has been taught, then, is an improved simulated spoke wire wheel cover facilitating, notably, substantially fixed radially inwardly ends of the spoke members and an overlapping or lap-joint fitting relationship at enlarged simulated nut end portions of the spokes. The form of the invention illustrated and described herein is but a preferred embodiment of these teachings. It is shown as an illustration of the inventive concept, however, rather than by way of limitation, and it is pointed out that various modifications and alterations may be indulged in within the scope of the appended claims.

What is claimed is:

1. A simulated wire wheel cover for attachment to the outer face of a vehicle wheel, said cover comprising, in combination:
   a retaining ring having a plurality of retention clips fastened to the outer margin thereof for bitingly engaging said vehicle wheel;
   a generally circular mounting plate secured at its peripheral portion to said retaining ring and having an annular generally radially facing spoke retaining flange having a plurality of apertures therein;
   a first generally circular retaining cap of a diameter which is substantially less than the diameter of said spoke retaining flange and having an annular generally axially inwardly directed and radially facing cap flange, said cap flange having a plurality of circumferentially spaced elongated slots therein which open at the axially inner edge of said cap flange;
   means for mounting said retaining cap to said mounting plate;
   a plurality of spoke members each spoke member comprising an elongated member having a looped central portion the diameter of which is greater than the circumferential width of said slots and a pair of legs extending therefrom in a generally V-shaped configuration, each of said spoke members being mounted in respective ones of said slots of said first cap wherein the loop portions thereof are disposed radially inwardly of said slots and wherein the free ends of said legs project through said slots, generally radially outwardly from said cap flange, and through a corresponding pair of said apertures of said mounting plate;
   a second generally circular retaining cap of a diameter which is substantially less than the diameter of said first cap and having an annular generally axially inwardly directed and radially facing cap flange with said second cap flange having a plurality of circumferentially spaced elongated slots which open at the axially inner edge of said second cap flange;
   means for mounting said second retaining cap to said mounting plate; and,
   a second plurality of spoke members each spoke member comprising an elongated member having a looped central portion the diameter of which is greater than the circumferential width of said slots of said second cap and a pair of legs extending therefrom in a generally V-shaped configuration, each of said spoke members being mounted in respective ones of said slots of said second cap wherein the loop portions thereof are disposed radially inwardly of said slots and wherein the free ends of said legs project through said slots of said second cap, generally radially outwardly from said flange of said second cap, and through a corresponding pair of said apertures of said mounting plate.

2. The simulated wire wheel cover according to claim 1, wherein each of said spoke members comprises a integral rod member.

3. The simulated wire wheel cover according to claim 2, wherein each of said spoke members further comprises an integral tubular rod member the free end portions of which are formed with enlarged diameters to provide simulated nuts projecting into said apertures.

4. The simulated wire wheel cover according to claim 3, wherein said slots are generally U-shaped.

5. The simulated wire wheel cover according to claim 4, wherein the diameter of each apertures is approximately equal to the diameter of the enlarged end portions of said spokes to provide an essentially zero clearance inserted relationship therebetween.

6. The simulated wire wheel cover according to claim 5, wherein the circumferential width of said slots is less than two times the diameter of the unenlarged diameter of said tubular rod members and wherein the axial length of said slots is at least equal to two times the diameter of the unenlarged diameter of said tubular rod members.

7. A simulated wire wheel cover for attachment to the outer face of a vehicle wheel, said cover comprising, in combination:
   a retaining ring having a plurality of retention clips fastened to the outer margin thereof for bitingly engaging said vehicle wheel;
   a generally circular mounting plate secured at its peripheral portion to said retaining ring and having an annular generally radially facing spoke retaining flange having a plurality of apertures therein;
   a first generally circular retaining cap mounted to said mounting plate and being of a diameter which is substantially less than the diameter of said spoke retaining flange and having an annular generally axially inwardly directed and radially facing cap flange, said cap flange having a plurality of circumferentially spaced elongated slots therein which open at the axially inner edge of said cap flange;
   a plurality of spoke members each spoke member comprising an elongated member having a looped central portion the diameter of which is greater than the circumferential width of said slots and a pair of legs extending therefrom in a generally V-shaped configuration, each of said spoke members being mounted in respective ones of said slots of said first cap wherein the loop portions thereof are disposed radially inwardly of said slots and wherein the free ends of said legs project through said slots, generally radially outwardly from said cap flange, and through a corresponding pair of said apertures of said mounting plate;

a second generally circular retaining cap mounted to said mounting plate and being of a diameter which is substantially less than the diameter of said first cap and having an annular generally axially inwardly directed and radially facing cap flange with said second cap flange having a plurality of circumferentially spaced elongated slots which open at the axially inner edge of said second cap flange; and, a second plurality of spoke members each spoke member comprising an elongated member having a looped central portion the diameter of which is greater than the circumferential width of said slots of said second cap and a pair of legs extending therefrom in a generally V-shaped configuration, each of said spoke members being mounted in respective ones of said slots of said second cap wherein the loop portions thereof are disposed radially inwardly of said slots and wherein the free ends of said legs project through said slots of said second cap, generally radially outwardly from said flange of said second cap, and through a corresponding pair of said apertures of said mounting plate.

* * * * *